(12) United States Patent
Alexander

(10) Patent No.: US 6,860,444 B2
(45) Date of Patent: Mar. 1, 2005

(54) LEADER BLOCK ASSEMBLY WITH TAPERED ENGAGEMENT SURFACES FOR A DATA STORAGE TAPE CARTRIDGE

(75) Inventor: Jerry L. Alexander, St. Paul Park, MN (US)

(73) Assignee: Imation Corp., Oakdale, MN (US)

( * ) Notice: Subject to any disclaimer, the term of this patent is extended or adjusted under 35 U.S.C. 154(b) by 13 days.

(21) Appl. No.: 10/295,811

(22) Filed: Nov. 15, 2002

(65) Prior Publication Data

US 2004/0094648 A1 May 20, 2004

(51) Int. Cl.$^7$ ............................................. G11B 23/107
(52) U.S. Cl. ................................. 242/348.2; 360/132
(58) Field of Search ........................ 242/348.2; 360/132

(56) References Cited

U.S. PATENT DOCUMENTS

| | | | |
|---|---|---|---|
| 4,775,115 A | 10/1988 | Gelardi | |
| 4,977,474 A | * 12/1990 | Oishi et al. | ............... 242/348.2 |
| 5,155,639 A | 10/1992 | Platter et al. | |
| 5,232,180 A | 8/1993 | Hoge et al. | |
| 5,261,626 A | 11/1993 | Hoge et al. | |
| 5,303,875 A | 4/1994 | Hoge et al. | |
| 5,379,167 A | * 1/1995 | Robles et al. | ................. 360/95 |
| 5,443,220 A | 8/1995 | Hoge et al. | |
| 5,465,187 A | 11/1995 | Hoge et al. | |
| 6,082,652 A | 7/2000 | Theobald | |
| 6,142,402 A | 11/2000 | Reilly | |
| 6,311,916 B1 | 11/2001 | Johnson et al. | |

* cited by examiner

*Primary Examiner*—John Q. Nguyen
(74) *Attorney, Agent, or Firm*—Eric D. Levinson

(57) ABSTRACT

A leader block assembly insertable into a data storage tape cartridge. The leader block assembly includes a leader block and a tape clamp. The leader block defines opposing sides, at least one opposing side forms an engagement surface defining a region of constant slope adapted to selectively engage a cartridge detent. The tape clamp is secured to the leader block.

20 Claims, 10 Drawing Sheets

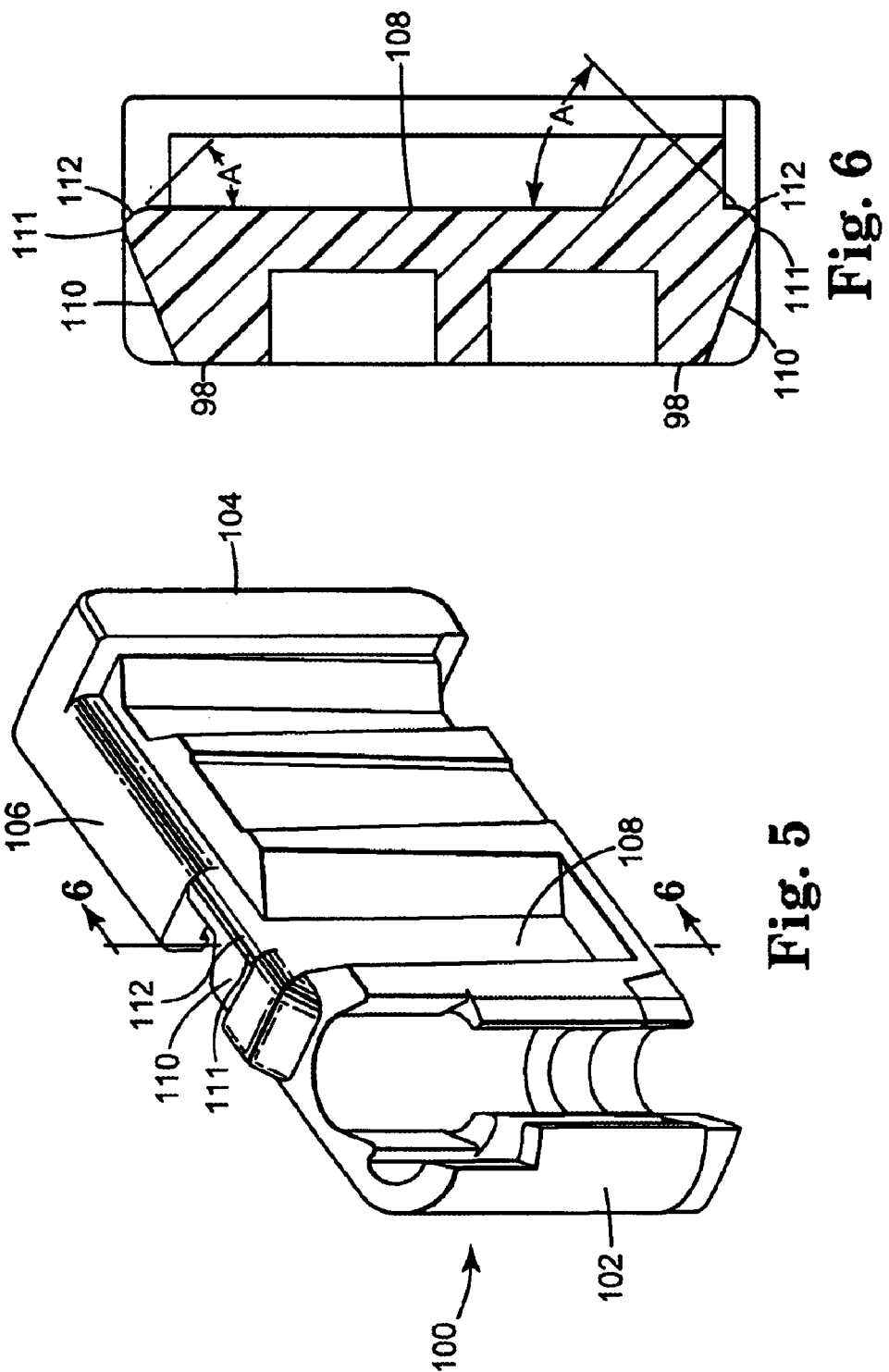

LEADER BLOCK ASSEMBLY WITH TAPERED ENGAGEMENT SURFACES FOR A DATA STORAGE TAPE CARTRIDGE

THE FIELD OF THE INVENTION

The present invention relates to a leader block assembly for a data storage tape cartridge. More particularly, it relates to a leader block assembly having tapered engagement surfaces configured to selectively engage portions of the housing of a data storage tape cartridge.

BACKGROUND OF THE INVENTION

Data storage tape cartridges have been used for decades in the computer, audio, and video fields. The data storage tape cartridge continues to be an extremely popular form of recording large volumes of information for subsequent retrieval and use.

Data storage tape cartridges generally consist of an outer shell enclosure, or housing, maintaining at least one tape reel assembly and a length of magnetic storage tape. The storage tape is wrapped about a hub portion of the tape reel assembly and is driven through a defined tape path by a separate driving system. For single reel cartridge designs, a free end of the storage tape is typically secured to a leader block assembly to assist in guiding the storage tape from the housing. The housing normally includes a separate cover and base, the combination of which forms an opening (or window) at a forward portion thereof at which the leader block assembly is selectively retained.

When accessing the data stored on a storage tape in a reel-to-reel magnetic tape drive application, the leader block assembly is directed away from the cartridge housing to an area within the tape drive device where a read/write head is located. In particular, the leader block assembly is removably inserted into a drive take-up reel (separate from the data storage tape cartridge), and the storage tape from the cartridge is wound about the take-up reel as data is accessed/recorded from the tape by the read/write head. When the data storage tape cartridge is not in use, the leader block assembly is secured within the cartridge housing.

In general terms, a leader block assembly consists of a leader block and a tape clamp that secures the storage tape to the leader block. A prior art leader block 20 is illustrated in FIGS. 1 and 2. The leader block 20 includes a leading section 22 and a trailing section 24, opposing sides 34 (one shown), an exterior face 26, and an engagement surface 30. The engagement surface 30 is a smoothly curved region (as best shown in the enlarged view of FIG. 2) contiguous with opposing side 34. The leading section 22 is configured to facilitate engagement with a take-up reel (not shown) via a slot 32.

Upon final assembly, and as shown in FIG. 3, the prior art leader block 20 is engaged within a data storage tape cartridge housing, referenced generally at 42. Prior art cartridge housings typically include a cover cartridge detent 44 and a base cartridge detent 46. The cartridge detents 44, 46 are positioned adjacent a leader block window 48 and project inward into the housing 42. The cartridge detents 44, 46 retain the leader block 20 and allow it to remain seated within the housing 42. To this end, the prior art cartridge detents 44, 46 are hemi-spherical and contact the leader block 20 at exactly one point on each of the leader block engagement surfaces 30.

Upon extraction, the leader block 20 must move between the cartridge detents 44, 46 when exiting the leader block window 48. The hemi-spherical cartridge detents 44, 46 splay apart as they respond to the extraction of the smoothly curved leader block engagement surfaces 30. The cartridge detents 44, 46 impinge upon the leader block engagement surfaces 30 creating a resistance that impedes removal of the leader block assembly 20. The extraction force is proportional to the resistance. Conversely, during insertion, the leader block 20 enters the leader block window 48 and the opposing sides 34 contact the cartridge detents 44, 46. The cartridge detents 44, 46 splay apart as they respond to the contact with the opposing sides 34. The splaying of the cartridge detents 44, 46 creates resistance to the insertion of the leader block 20 that is proportional to the insertion force. Given a sufficient insertion force, the cartridge detents 44, 46 spread over the respective opposing sides 34 and engage with the smoothly curved engagement surfaces 30. Upon such engagement, the leader block 20 is seated within housing 42.

The cartridge detents 44, 46 of FIG. 3 have a limited ability to resist the removal of the leader block 20. For this reason, achieving a high extraction force can be difficult. Conversely, after extraction, the insertion force must be low enough so that the tape drive (not shown) is able to return and seat the leader block 20 into the housing 42. Because the cartridge detents 44, 46 are symmetrical, the insertion force the leader block 20 experiences when seated back into the data storage tape cartridge housing 42 is, for all relevant purposes, equal to the extraction force. Considering this, the prior art leader block 20 presents a challenging dilemma: high extraction forces will cause insertion failures, and low insertion forces lead to the leader block 20 inadvertently falling out of the housing 42.

Current leader blocks meet the needs of some data storage tape cartridge users. However, the potential exists for leader blocks having marginally high extraction forces to exhibit slippage from the data storage tape cartridge housing when shipped or dropped. Conversely, the potential exists for leader blocks having marginally low insertion forces to exhibit improper seating into the data storage tape cartridge housing. As such, a need exists for a leader block having a high extraction force and a low insertion force.

SUMMARY OF THE INVENTION

One aspect of the present invention relates to a leader block assembly insertable into a data storage tape cartridge housing. The leader block assembly includes a leader block and a tape clamp secured to the leader block. The leader block has opposing sides and an exterior face defining a major plane. At least one opposing side of the leader block forms an engagement surface extending linearly at an angle relative to the major plane. The engagement surface of the leader block is adapted to selectively engage a cartridge detent of the data storage tape cartridge housing.

Another aspect of the present invention relates to a data storage tape cartridge. The data storage tape cartridge includes a housing, at least one tape reel assembly, a storage tape, and a leader block assembly. The housing has at least one cartridge detent and forms an enclosure. The tape reel assembly includes a hub and is disposed within the housing enclosure. The storage tape is wrapped about the hub. The leader block assembly has a leader block secured to a leading end of the storage tape by a tape clamp. The leader block has opposing sides and an exterior face defining a major plane, at least one opposing side forming an engagement surface extending linearly at an angle relative to the exterior face and adapted to selectively engage the cartridge detent.

Yet another aspect of the present invention relates to a method of inserting a leader block assembly into a data storage tape cartridge housing. The leader block has opposing sides and an exterior face. At least one opposing side forms an engagement surface extending linearly at an angle relative to a major plane defined by the exterior face and adapted to selectively engage a cartridge detent positioned on a flexible arm of the housing. With this in mind, the method comprises directing the leader block assembly toward the housing of the data storage tape cartridge. By application of an insertion force, the flexible arm is deflected and a linear portion of the leader block engagement surface is seated against a flat face of the cartridge detent. A final assembly position is achieved in which the leader block engagement surface is selectively engaged with the cartridge detent within the housing of the data storage tape cartridge. In this way, the removal of the leader block assembly from the data storage tape cartridge is impeded.

BRIEF DESCRIPTION OF THE DRAWINGS

FIG. 5 is perspective view of one embodiment of the present invention of a leader block assembly without tape clamp;

FIG. 6 is a cross section of the leader block of FIG. 5 showing the orientation of the engagement surfaces;

DETAILED DESCRIPTION OF THE PREFERRED EMBODIMENTS

Figure 1:
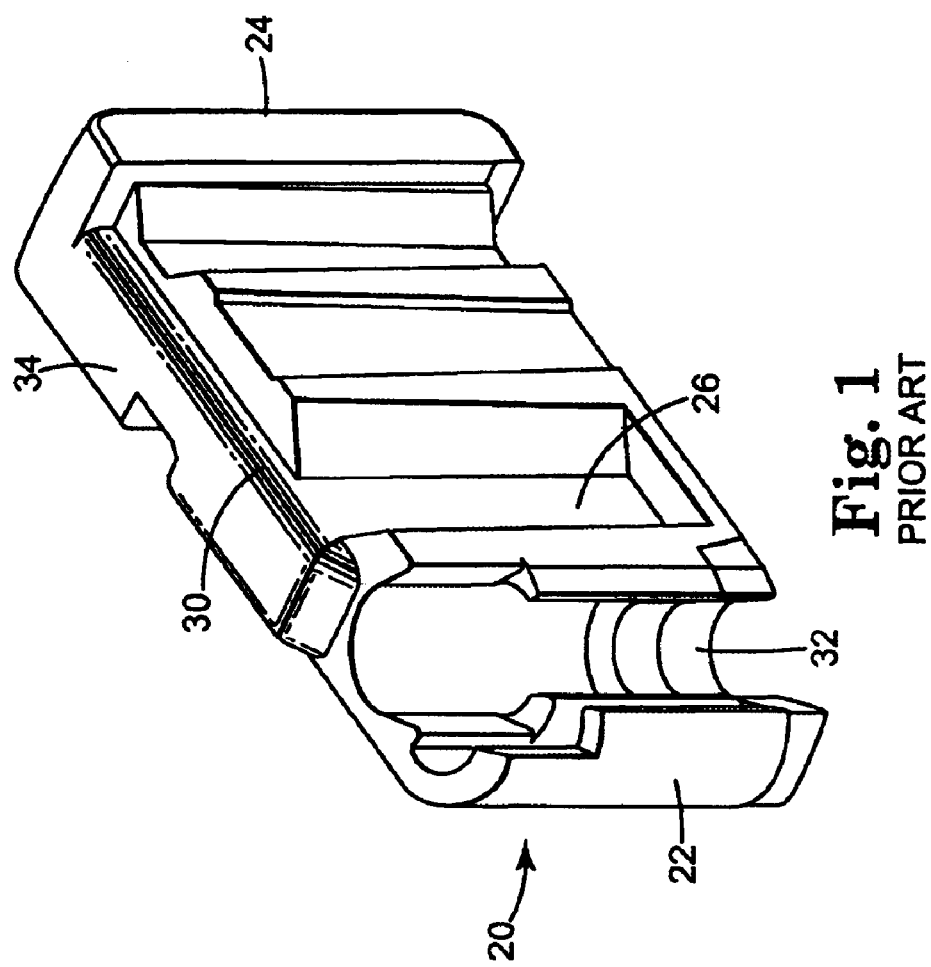
FIG. 1 is a perspective view of a prior art leader block.
Figure 2:
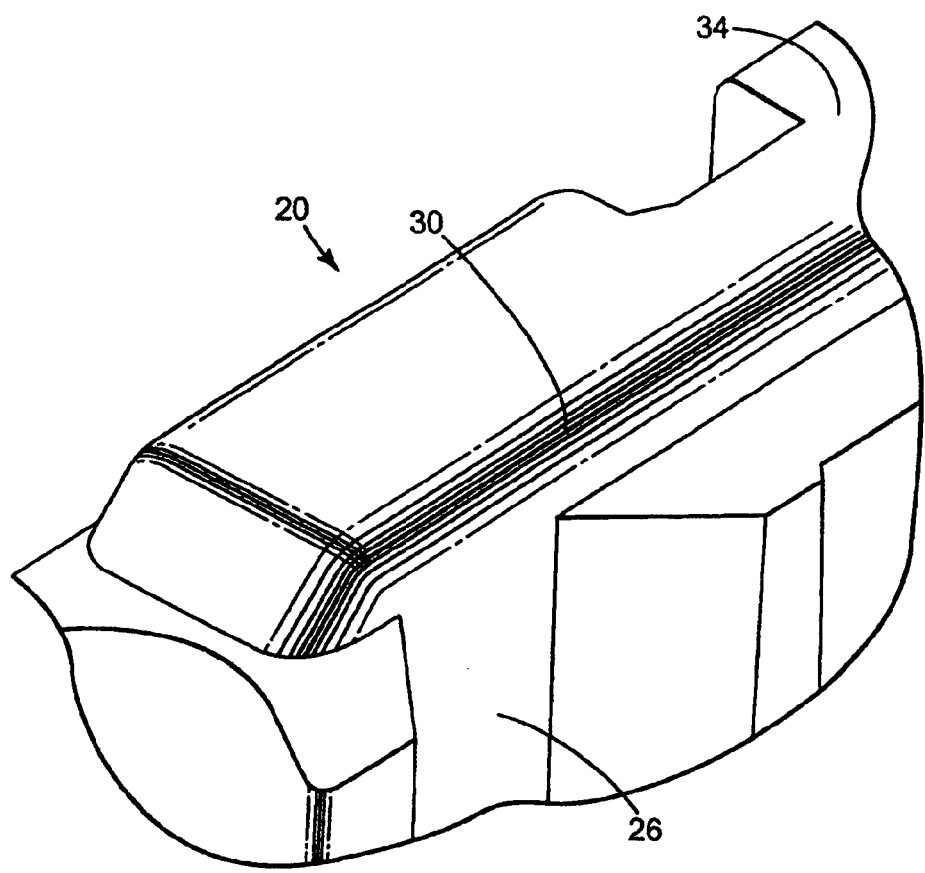
FIG. 2 is a perspective, enlarged view of the leader block of FIG. 1.
Figure 3:
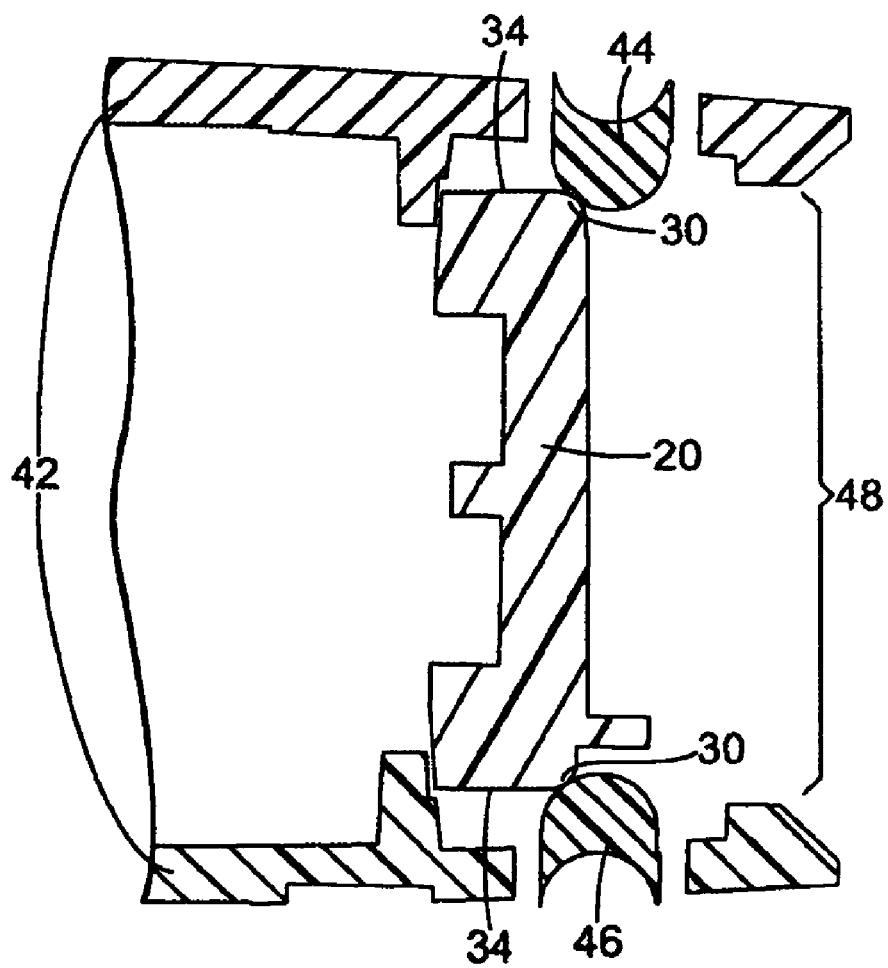
FIG. 3 is a cross section of the leader block of FIG. 1 inserted into a cartridge housing showing cartridge detents.
Figure 4:
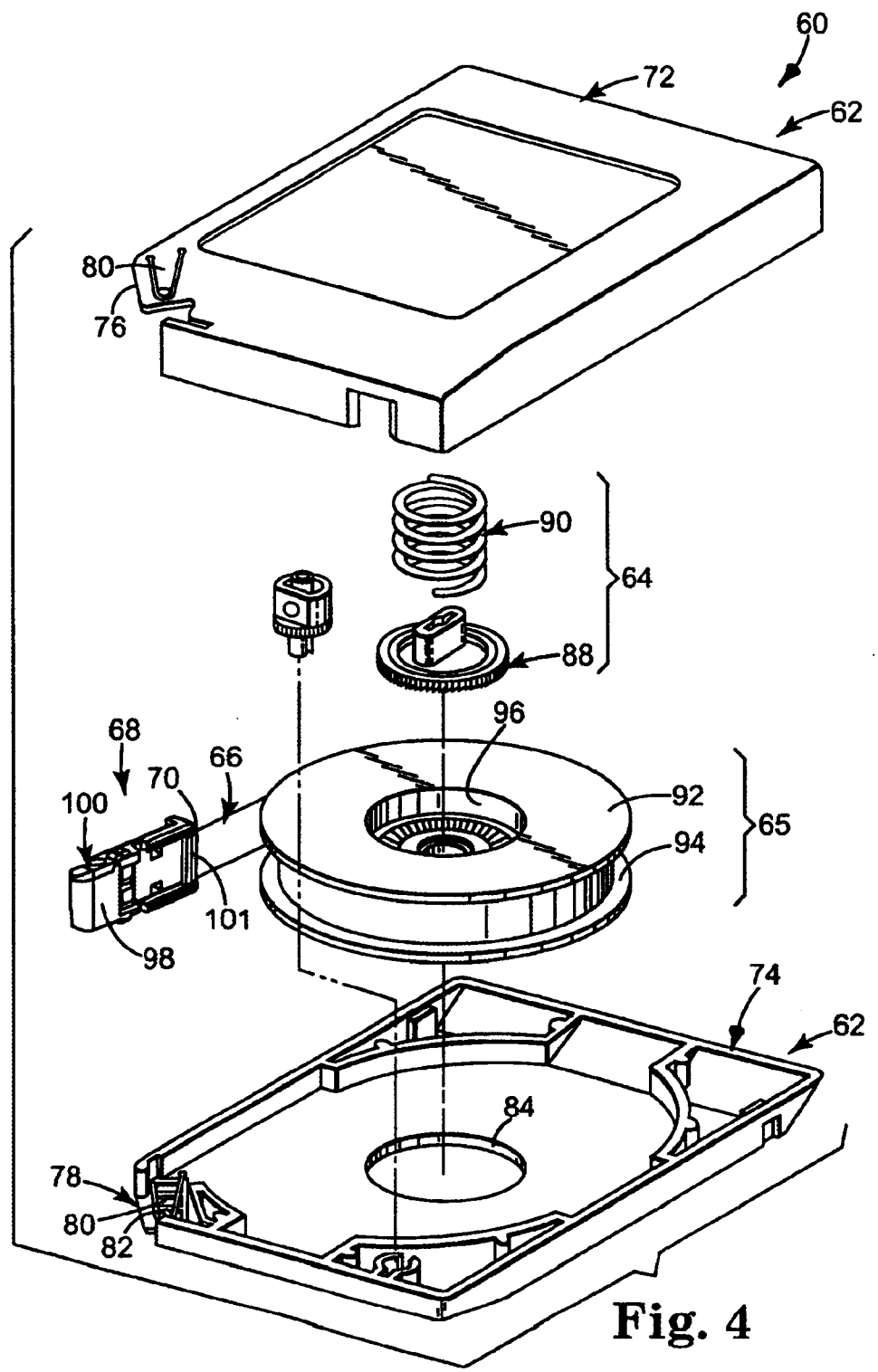
FIG. 4 is a perspective, exploded view of a data storage tape cartridge.

One embodiment of a data storage tape cartridge 60 in accordance with the present invention is shown in FIG. 4. Generally, the data storage tape cartridge 60 includes a housing 62, a brake assembly 64, a tape reel assembly 65, a storage tape 66, and a leader block assembly 68. The tape reel assembly 65 is disposed within the housing 62. The storage tape 66, in turn, is wound about the tape reel assembly 65 and includes a leading end 70 attached to the leader block assembly 68.

The housing 62 is sized to be received by a typical tape drive (not shown). Thus, the housing 62 exhibits a size of approximately 125 mm×110 mm×21 mm, although other dimensions are equally acceptable. With this in mind, the housing 62 is defined by a first housing section 72 and a second housing section 74. In one embodiment, the first housing section 72 forms a cover, whereas the second housing section 74 forms a base. As used throughout the specification, directional terminology, such as "cover", "base", "upper", "lower", "top", "bottom", etc., are used for purposes of illustrations only and are in no way limiting.

The first and second housing sections 72, 74 are configured to be reciprocally mated to one another and are generally rectangular except for one corner 76 that is preferably angled and forms a leader block window 78. In this regard, each of the housing sections 72, 74 includes a flexible arm 80 that maintains a cartridge detent 82, it being understood that the detent associated with the first housing section 72 is hidden in the view of FIG. 4. The cartridge detents 82 provide resistance to the leader block assembly 68 upon insertion and extraction, as described in greater detail below. Therefore, the cartridge detents 82 are configured to secure the leader block assembly 68 when stored in the leader block window 78. The leader block window 78 serves as an opening for the storage tape 66 to exit from the housing 62 such that the storage tape 66 can be threaded to a tape drive (not shown) when the leader block assembly 68 is removed from the leader block window 78. Conversely, when the leader block assembly 68 is engaged in the leader block window 78, the leader block window 78 is covered.

In addition to the leader block window 78, the second housing section 74 further forms a central opening 84. The central opening 84 facilitates access to the tape reel assembly 65 by a drive chuck portion of the tape drive (not shown).

The brake assembly 64 is of the type known in the art and generally includes a brake 88 and a spring 90. The tape reel assembly 65 is also a known component and includes an upper flange 92, a lower flange 94, and a ring shaped hub 96, and is sized to co-axially receive the brake assembly 64. The storage tape 66 is wound about the hub 96, constrained laterally by the flanges 92, 94. As is known in the art, the brake 88 and the spring 90 selectively "lock" the tape reel assembly 65 to the housing 62 when the data storage tape cartridge 60 is not in use.

The storage tape 66 is preferably a magnetic tape of a type commonly known in the art. For example, the storage tape 66 may consist of a balanced polyethylene naphthalate (PEN) based material coated on one side with a layer of magnetic material dispersed within a suitable binder system and coated on the other side with a conductive material dispersed within a suitable binder system. Acceptable magnetic tape is available, for example, from Imation Corp., of Oakdale, Minn.

Referring to FIG. 4, the leader block assembly 68 includes a leader block 100 and a tape clamp 101. The leader block assembly 68 both covers the leader block window 78 and facilitates retrieval of the storage tape 66 for accessing the stored information via the read/write head. The leader block 100 is secured to a leading end 70 of the storage tape 66 by the tape clamp 101. The leader block 100 defines an interior face 98 that faces inside the housing 62 when the leader block assembly 68 is positioned in the leader block window 78. In general terms, the leader block 100 is configured to conform to the housing 62 and to cooperate with the tape drive (not shown). The leader block 100 selectively engages the cartridge detents 82 of housing 62 while providing a grasping surface for the tape drive to manipulate in accessing the storage tape 66.

The leader block 100 and the tape clamp 101 are preferably formed from rigid materials. In one embodiment, the leader block 100 is molded from a glass-filled polycarbonate and the tape clamp 101 is molded from acetal, although other materials and manufacturing techniques are also acceptable.

In one embodiment of the present invention illustrated in FIG. 5, the leader block 100 defines a leading section 102, a trailing section 104, opposing sides 106 (one shown), and an exterior face 108. The exterior face 108 is orthogonal to the opposing sides 106. A detent reception ramp 110 is provided at each of the opposing sides 106 and is configured to receive a respective one of the cartridge detents 82 (FIG. 4). A transition surface 111 abuts the detent reception ramp 110. The transition surface 111 provides a low resistance pathway for the cartridge detent 82 to traverse in reaching an engagement surface 112. Each of the opposing sides 106 form the linear engagement surface 112 (one shown) that is adapted to selectively engage a respective one of the cartridge detents 82. The engagement surfaces 112, therefore, define regions of constant slope.

The relative orientation of the engagement surfaces 112 is best shown in the cross-sectional view of FIG. 6. The exterior face 108 defines a vertical, or major, plane (relative to the orientation of FIG. 6). The engagement surfaces 112 extend linearly at an angle A from the major plane to form a region of constant slope. The angle A is taken with respect to the major plane defined by the exterior face 108 and is between 0 and 90 degrees, more preferably between 20 and 70 degrees, even more preferably between 30 and 60 degrees, and most preferably 45 degrees. The slope of the engagement surfaces 112 is defined as the tangent of the angle A formed by the intersection of the engagement surfaces 112 with the major plane defined by the exterior face 108.

The engagement surfaces 112 can define a variety of widths, some being narrow engagement surfaces, others being wide engagement surfaces. The width of the engagement surfaces 112 is the dimension extending linearly from the transition surface 111 toward the major plane defined by the exterior surface 108. Engagement surfaces 112 that are narrow have widths less than 0.020 inch; one preferred narrow engagement surface has a width of 0.013 inch. Engagement surfaces 112 that are wide have widths greater than 0.020 inch. One preferred wide engagement surface has a width of 0.033 inch.

The transition surface 111 extends linearly between the engagement surface 112 and the detent reception ramp 110. The transition surface 111 is a low resistance pathway extending linearly away from the detent reception ramp 110 for a given distance. This distance, or width, of the transition surface 111 is preferably less than 0.020 inch. In one preferred embodiment, the transition surface 111 has a width of 0.013 inch.

Figure 7A:
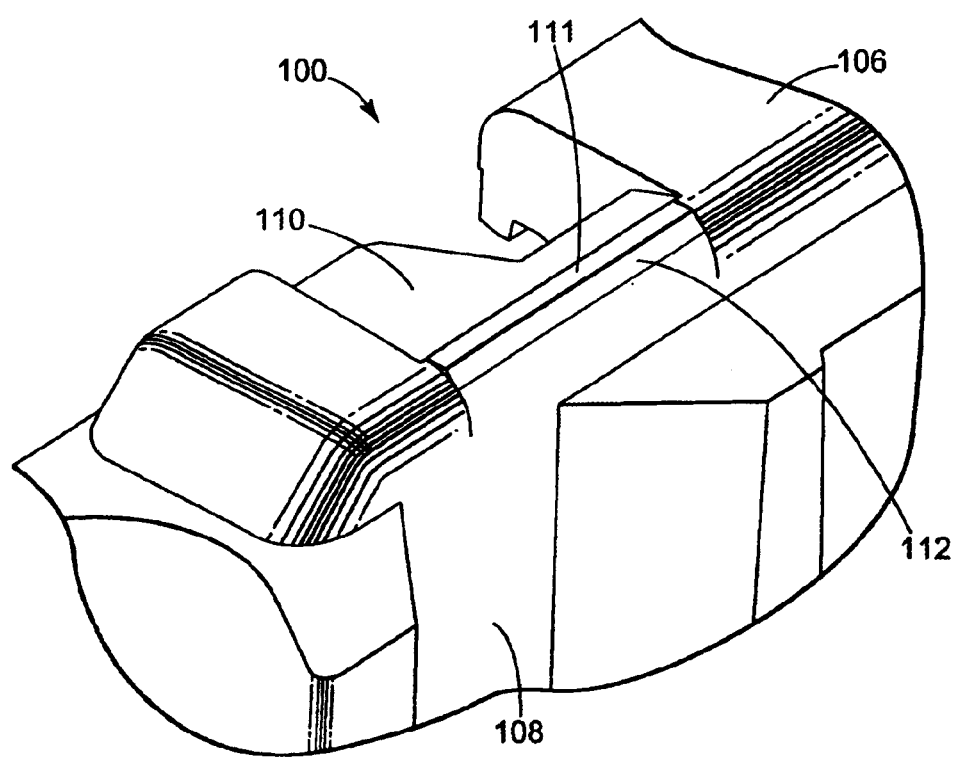
FIG. 7a is an enlarged view of the leader block of FIG. 5 showing a narrow engagement surface.

A preferred embodiment of a leader block 100 having a narrow engagement surface 112 reposed at an angle A of 45 degrees to the major plane defined by the exterior face 108 is shown in FIG. 7a. The narrow engagement surface 112 utilizes less material in forming an effective engagement area. Narrow engagement surface 112 terminates on the exterior face 108 with a smooth curvature. The configuration shown in FIG. 7a is but one example of an acceptable design. For example, as shown in FIG. 7b, is a wide engagement surface 112'.

Figure 7B:
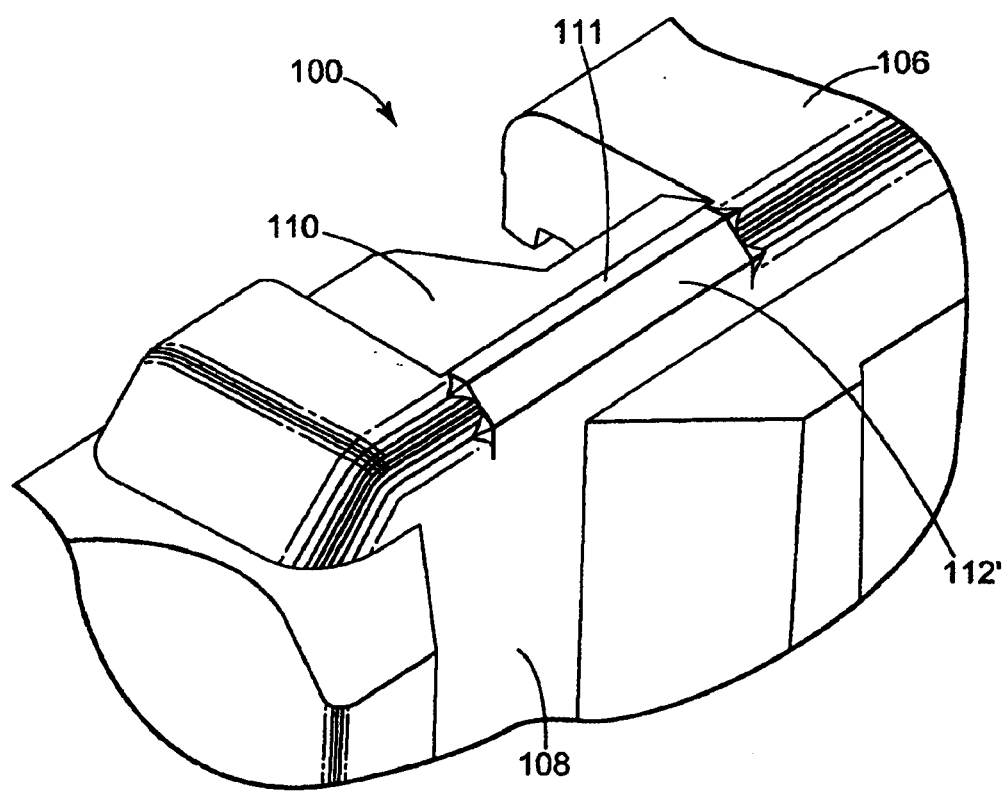
FIG. 7b is an enlarged view of a leader block showing a wide engagement surface.

FIG. 7b depicts an embodiment of a leader block 100 having a wide engagement surface 112' extending linearly at an angle A of 45 degrees. The wide engagement surface 112' provides approximately twice the surface area of the narrow engagement surface 112. The wide engagement surface 112' terminates in the vertical plane of exterior face 108. While only one of the engagement surfaces 112 and 112' is shown in FIGS. 7a and 7b, respectively, it should be understood that the opposite engagement surface is identically formed. While FIGS. 7a and 7b illustrate engagement surfaces 112 and 112' of varying widths extending linearly at an angle A of 45 degrees, it should be understood that the engagement surfaces 112 and 112' could extend linearly at any angle A in the range from 0 to 90 degrees.

With reference to FIG. 6, when the engagement surfaces 112 are orientated by an angle A of less than 10 degrees to the major plane defined by the exterior face 108, the engagement surfaces 112 are nearly vertical, essentially forming sharp drop offs. Extraction forces of several pounds are realized in this case. When the engagement surfaces 112 are oriented at an angle A of 90 degrees, the engagement surfaces 112 are parallel to, and part of, the transition surfaces 111 resulting in low extraction forces. However, when the engagement surfaces 112 are oriented at an angle A of 20–70 degrees, most preferably 45 degrees (as in FIGS. 7a and 7b), the engagement surfaces 112 form regions adapted to engage with the cartridge detents 82 (FIG. 4). Engagement surfaces 112 oriented at angles A of 20–70 degrees provide dramatic increases in the resistance to extraction when compared to prior art leader blocks 20.

Figure 8:
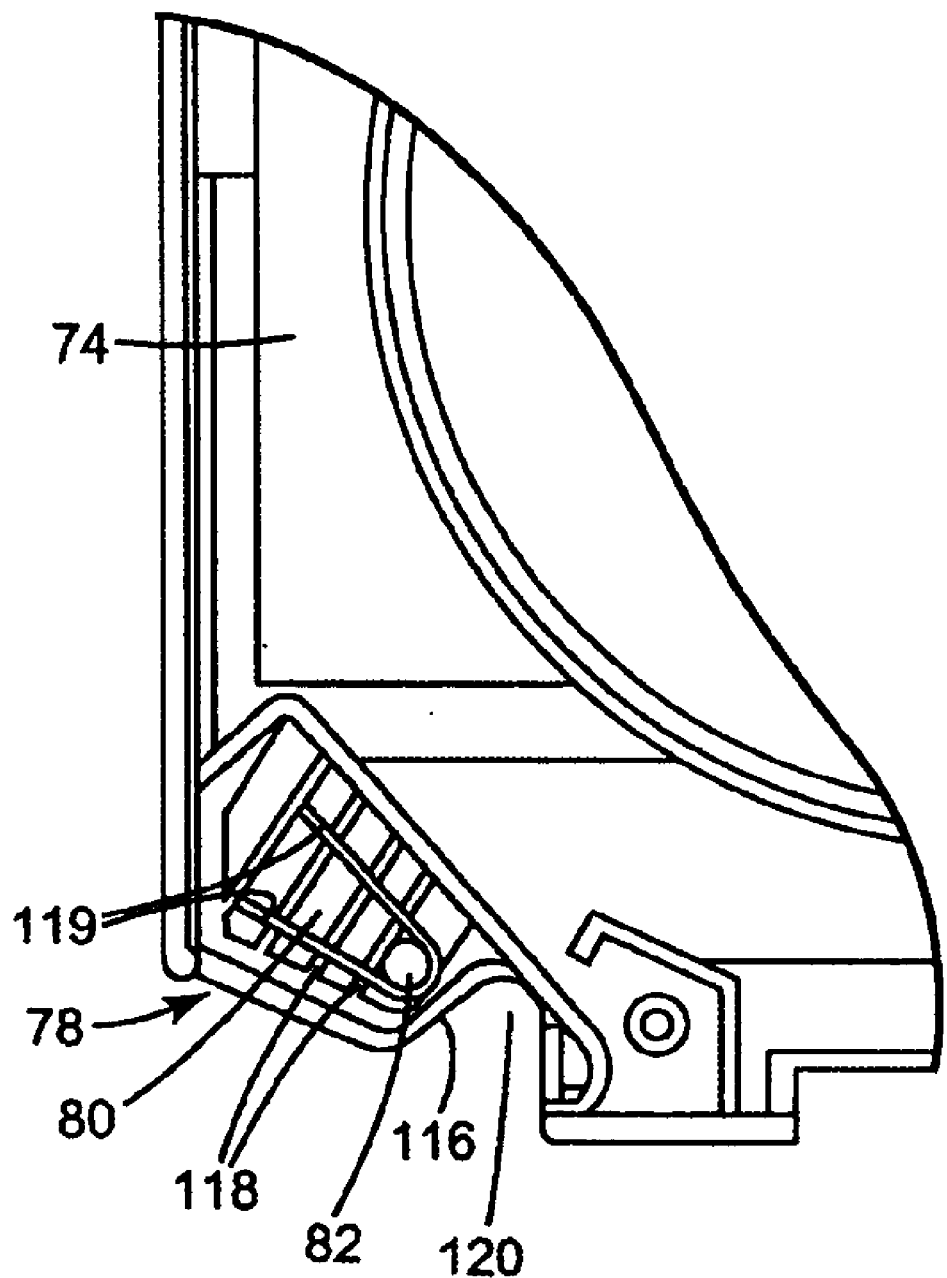
FIG. 8 is an enlarged, top view of the data storage tape cartridge base showing a flexible arm and a cartridge detent.

The interaction between the above-described leader block 100 and the tape cartridge housing 62 (FIG. 4) is provided below. In general terms, and with reference to FIG. 8, the housing sections 72, 74 form a cover and a base. FIG. 8 is an enlarged, top view of the second housing section 74. The second housing section 74 defines the leader block window 78, and includes a flexible arm 80 having the cartridge detent 82 at an apex, and arm spines 118. The second housing section 74 further includes a curved edge 116 defining a cavity 120 that communicates with the leader block 100 (FIG. 5) when stored in the leader block window 78. The flexible arm 80 is configured to flex into and out of the plane of the second housing section 74 (i.e., the plane of FIG. 8). The flexibility of the flexible arm 80 is determined by the length of the arm channels 119 and the thickness of the flexible arm 80. Longer arm channels 119 allow greater deflection of the flexible arm 80. Flexible arms 80 that have greater thickness flex less. Generally, longer arm channels 119 and thinner flexible arms 80 allow more movement of the cartridge detent 82, and lower resistance to the insertion of the leader block 100. The arm spines 118 give flexural strength to the flexible arm 80 and resist twisting. The thickness of the flexible arm 80 is preferably configured to minimize the force required to insert the leader block assembly 68. The desired combination of high extraction forces and low insertion forces may be achieved by the proper configuration of the engagement surfaces 112, arm channels 119, and appropriately thin flexible arms 80. For example, in one preferred embodiment, each of the flexible arms 80 has a thickness in the range of 0.020 inch to 0.100 inch, more preferably 0.040 inch to 0.080 inch and the arm channels have a length of 0.20 inch to 1.00 inch, more preferably 0.40 inch to 0.80 inch.

Figure 9:
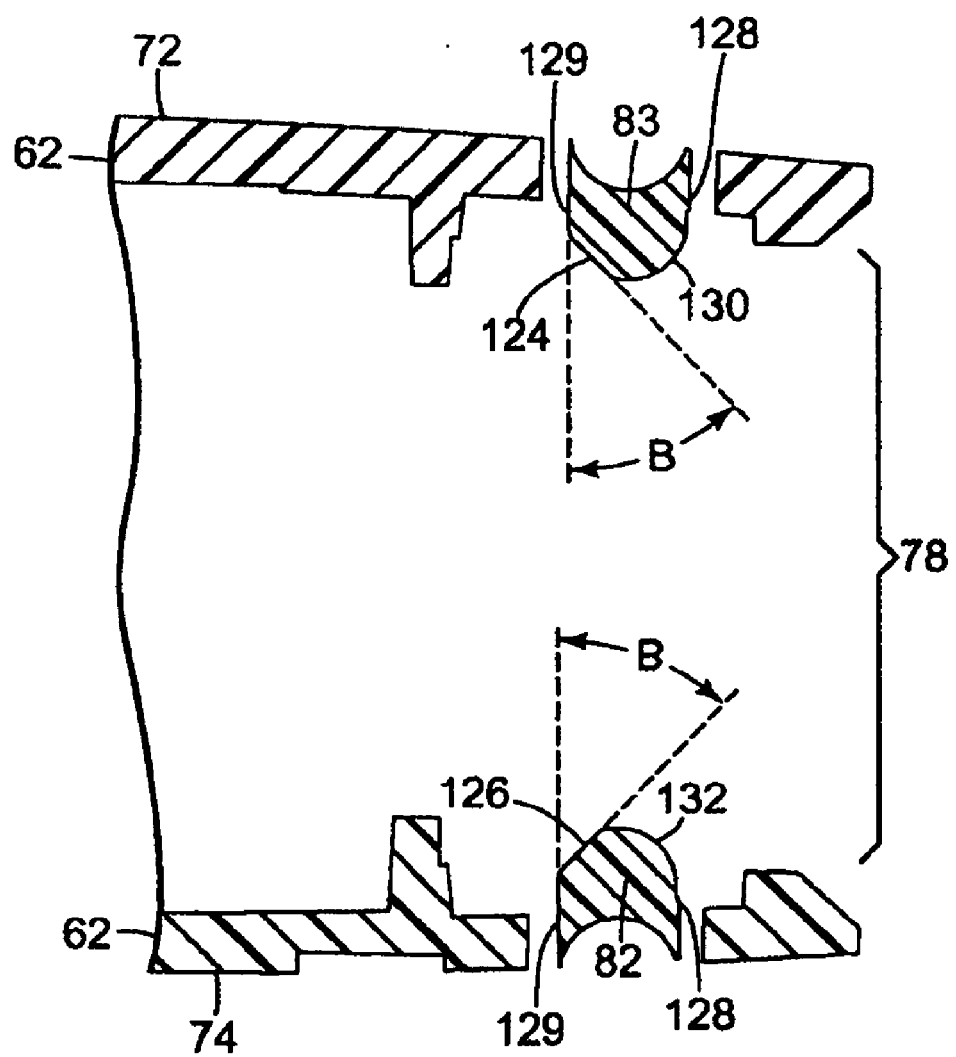
FIG. 9 is a cross section view of a data storage tape cartridge housing without the leader block assembly inserted.

The cartridge detents 82 are shown in greater detail in FIG. 9 that illustrates a cross-section of the data storage tape cartridge housing 62 without a leader block assembly inserted. The housing 62 as presented forms the leader block window 78 and includes the base detent 82 and a cover detent 83. The cartridge detents 82, 83 are positioned inside the housing 62. Each of the cartridge detents 82, 83 include a leading edge 128 oriented toward the leader block window 78, and a trailing edge 129 opposite the leader block window 78. The cartridge detents 82, 83 are substantially hemispherical in geometry, having rounded surfaces 130, 132, respectively, on the leading edge 128. Additionally, the cartridge detents 82, 83 are provided with detent faces 124, 126, respectively, on the trailing edge 129. The detent faces 124, 126 are flat surfaces extending linearly across the trailing edge 129 of the cartridge detents 82, 83. In this way, the detent faces 124, 126 define a face angle B taken with respect to the vertical (as oriented in FIG. 9) trailing edge 129 of cartridge detents 82, 83. As described below, the detent faces 124, 126 engage with an inserted leader block assembly.

Figure 10:
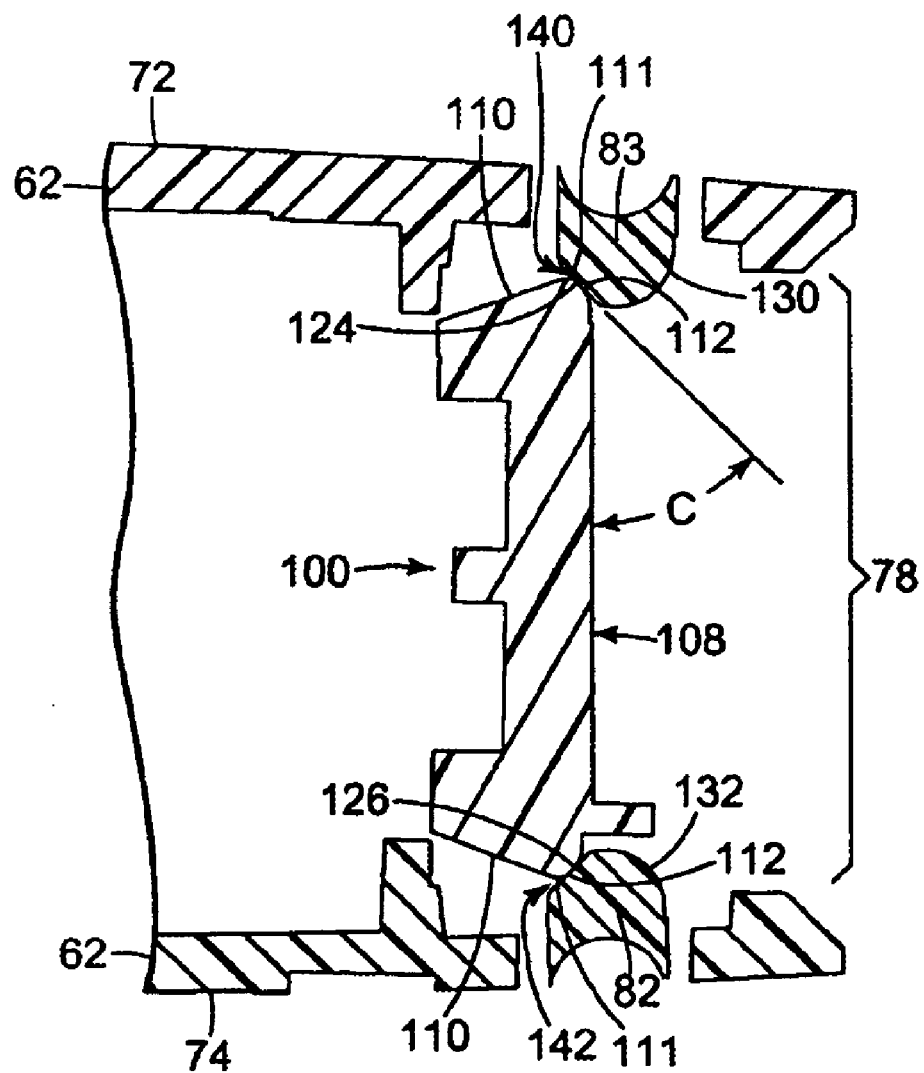
FIG. 10 is a cross section of a data storage tape cartridge housing with a leader block assembly inserted.

The relationship between the leader block 100 surfaces and the cartridge detents 82, 83 is shown in FIG. 10. Specifically, FIG. 10 illustrates a cross-section of one embodiment of the present invention of the data storage tape cartridge housing 62 with the leader block 100 inserted. As the leader block 100 is inserted, i.e., moved from an exterior of the housing 62 leftward (relative to the orientation of FIG. 10) through the leader block window 78, the rounded surfaces 130, 132 of the leading edge 128 of the cartridge detents 82, 83 contact the detent reception ramps 110. The insertion force causes the detent reception ramps 110 to splay the cartridge detents 82, 83 apart. The cartridge detents 82, 83 are then received by the transition surfaces 111. The transition surfaces 111 are low resistance pathways that direct the cartridge detents 82, 83 to the engagement surfaces 112. Complete insertion of the leader block 100 occurs when the engagement surfaces 112 contact the detent faces 124, 126. Thereafter, the leader block 100 is engaged within the housing 62 and the detent faces 124, 126 abut with the leader block engagement surfaces 112 to inhibit the removal of the leader block 100. The detent faces 124, 126 cooperate with the leader block engagement surfaces 112 to impede the removal of the leader block assembly 68 from the housing 62.

Upon final assembly, the leader block 100 is engaged within housing 62, and the leader block engagement surfaces 112 abut against the detent faces 124, 126, respectively, of the cartridge detents 82, 83, respectively. When the angle A of the engagement surfaces is equal to the detent face angle B, matching tapered interfaces 140, 142, respectively, are formed having an interface angle C. The matching tapered interfaces 140, 142 are contacting surfaces that resist the extraction of the leader block assembly 68 from the housing 62. Extraction of the leader block 100 requires moving the leader block 100 toward the leader block window 78. In extracting the leader block 100, the matching tapered interfaces 140, 142 impede the removal of the leader block 100 to a desired extent. In this way, the matching tapered interfaces 140, 142 cooperate to increase the extraction force.

The leader block engagement surfaces 112 and the detent faces 124, 126 contact in such a way as to provide high resistance to the extraction of the leader block 100 from the cartridge housing 62. In other words, an elevated extraction force is required to remove the leader block 100 from the housing 62. Conversely, with insertion, the leader block 100 meets with little resistance. Upon insertion, the leader block 100 deflects the flexible arms 80 and the cartridge detents 82, 83, respectively, until the leader block 100 is seated within the housing 62. The insertion force of the leader block 100 is much lower than the extraction force. The detent faces 124, 126 are configured to provide high resistance to the leader block engagement surfaces 112 only upon extraction.

In one preferred embodiment, the matching tapered interfaces 140, 142 between the leader block engagement surfaces 112 and the cartridge detent faces 124, 126 create extraction forces greater than 0.5 pound. The insertion forces are much lower than the extraction forces, the insertion forces being less than 0.4 pound. In this way, the extraction force in practice is greater than 0.6 pound, and the insertion force is less than 0.4 pound. Because of this, the leader block 100 may be securely engaged within the housing 62, and the tape drive is able to properly seat the leader block 100 into the housing 62 during insertion.

A useful feature of the leader block 100 of the present invention is that the engagement surfaces 112 contact the detent faces 124, 126 across a surface, rather than along a line. In this way, the resistance to extraction is applied by a surface area from the detent faces 124, 126 to the engagement surfaces 112 of the leader block 100. When the pressure of the detent faces 124, 126 is applied across a larger area, higher extraction forces are achieved. In direct contrast, the resistance to extraction of prior art leader block assemblies is due to the hemi-spherical detents contacting the leader block at only one point on each of the curved engagement surfaces.

The leader block 100 of the present invention has been configured such that the engagement surfaces 112 abut with the detent faces 124, 126. Large extraction forces are possible and may be varied by the interface angle C. Acute interface angles C of less than 10 degrees create a "locking clasp" between the cartridge detents 82, 83 and the engagement surfaces 112. In this case, extraction forces of several pounds have been observed. Both the engagement surfaces 112 of the leader block 100 and the detent faces 124, 126 can be configured so that the extraction force may be selectively tuned. Larger contacting surfaces create greater resistance to the extraction of the leader block 100 from the housing 62. The preferred range of the extraction force for the leader block assembly as it is extracted from the window of the data storage tape cartridge is preferably greater than 0.4 pound, more preferably greater than 0.5 pound. The preferred range of the insertion force for the leader block assembly as it is inserted into the cartridge housing is preferably less than 0.5 pound, more preferably less than 0.4 pound.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A leader block assembly insertable into a data storage tape cartridge having at least one cartridge detent, the leader block assembly comprising:

a leader block defining opposing sides, an interior face adapted to accept a tape clamp, and an exterior opposite the interior face, the exterior face defining a major plane, wherein at least one opposing side forms an engagement surface presented toward the exterior face and extending linearly at an angle relative to the major plane, the engagement surface adapted to selectively engage a cartridge detent of the data storage tape cartridge; and a tape clamp secured to the interior face of the leader block.

2. The leader block assembly of claim 1, wherein the angle is less than 90 degrees.

3. The leader block assembly of claim 1, wherein the angle is in the range of approximately 30 degrees to approximately 60 degrees.

4. The leader block assembly of claim 1, wherein the angle is approximately 45 degrees.

5. A data storage tape cartridge comprising:
a housing including at least one cartridge detent, the housing defining an enclosure;
at least one tape reel assembly disposed within the enclosure, the tape reel assembly including a hub;
a storage tape wrapped about the hub; and
a leader block assembly secured onto a leading end of the storage tape, the leader block assembly including:
a leader block defining opposing sides, an interior face relative to the housing, and an exterior face relative to the housing, wherein the exterior face defines a major plane and at least one opposing side presents an engagement surface toward the exterior face, the engagement surface extending linearly at an angle relative to the major plane, the engagement surface adapted to selectively engage the at least one cartridge detent of the housing, and
a tape clamp secured to the leader block.

6. The data storage tape cartridge of claim 5, wherein the at least one cartridge detent defines an outer surface positioned to selectively contact the leader block, wherein at least a portion of the outer surface is flat.

7. The data storage tape cartridge of claim 5, wherein the at least one cartridge detent includes a leading edge and a trailing edge, a detent face extending linearly at a face angle relative to the trailing edge and adapted to selectively engage the leader block engagement surface.

8. The data storage tape cartridge of claim 7, wherein the face angle is less than 90 degrees.

9. The data storage tape cartridge of claim 7, wherein the face angle is in the range of approximately 30 degrees to approximately 60 degrees.

10. The data storage tape cartridge of claim 7, wherein the face angle is approximately 45 degrees.

11. The data storage tape cartridge of claim 7, wherein in an engaged position, the engagement surface and the detent face contact across a matching tapered interface characterized by an interface angle.

12. The data storage tape cartridge of claim 5, wherein the at least one cartridge detent is positioned on a flexible arm, the flexible arm defining an arm channel and an arm thickness.

13. The data storage tape cartridge of claim 12, wherein the arm thickness is less than 0.10 inch.

14. The data storage tape cartridge of claim 12, wherein the arm channel and the arm thickness combine to provide a resistance to the insertion of the leader block characterized by an insertion force of less than 0.5 pound.

15. The data storage tape cartridge of claim 5, wherein the removal of the leader block assembly from the housing is characterized by an extraction force of greater than 0.6 pound.

16. A method of inserting a leader block assembly into a data storage tape cartridge housing, the leader block assembly having a leader block defining opposing sides, at least one opposing side forming an engagement surface extending linearly at an angle to a major plane defined by an exterior face, the engagement surface adapted to selectively engage a cartridge detent positioned on a flexible arm of the housing, the method comprising:
directing the leader block assembly toward the housing;
deflecting the flexible arm through the application of an insertion force;
seating a linear portion of the engagement surface against a flat face of the cartridge detent; and
achieving a final assembly position in which the leader block engagement surface is selectively engaged with the cartridge detent across an interface area to impede removal of the leader block assembly from the data storage tape cartridge.

17. The method of inserting a leader block assembly of claim 16, wherein deflecting the flexible arm is characterized by an insertion force of less than 0.5 pound.

18. The method of inserting a leader block assembly of claim 16, wherein the engagement surface is selectively engaged with the cartridge detent across a matching tapered interface characterized by an interface angle.

19. The method of inserting a leader block assembly of claim 18, wherein the interface angle is approximately 45 degrees.

20. The method of inserting a leader block assembly of claim 16, wherein after achieving the final assembly position, the removal of the leader block is characterized by an extraction force of greater than 0.6 pound.

* * * * *